(12) United States Patent
Park et al.

(10) Patent No.: US 9,143,257 B2
(45) Date of Patent: Sep. 22, 2015

(54) METHOD AND APPARATUS FOR TRANSMITTING SIGNAL

(75) Inventors: Hyeong-Geun Park, Daejeon (KR); Il-Gyu Kim, Daejeon (KR); Kap-Seok Chang, Daejeon (KR); Young-Jo Ko, Incheon (KR); Hyo-Seok Yi, Incheon (KR); Young-Hoon Kim, Incheon (KR); Seung-Chan Bang, Incheon (KR)

(73) Assignees: ELECTRONICS AND TELECOMMUNICATIONS RESEARCH INSTITUTE, Daejeon (KR); SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 1069 days.

(21) Appl. No.: 12/634,871

(22) Filed: Dec. 10, 2009

(65) Prior Publication Data

US 2010/0086129 A1  Apr. 8, 2010

Related U.S. Application Data

(63) Continuation of application No. 12/598,256, filed as application No. PCT/KR2008/001317 on Mar. 7, 2008.

(30) Foreign Application Priority Data

May 2, 2007 (KR) .................. 10-2007-0042457
May 8, 2007 (KR) .................. 10-2007-0044356
Dec. 7, 2007 (KR) .................. 10-2007-0126724

(51) Int. Cl.
*H04K 1/00* (2006.01)
*H04J 13/00* (2011.01)
(Continued)

(52) U.S. Cl.
CPC ............... *H04J 13/00* (2013.01); *H04L 1/0041* (2013.01); *H04L 1/0046* (2013.01);
(Continued)

(58) Field of Classification Search
CPC ....................................................... H04N 7/167
USPC ......................................................... 380/255
See application file for complete search history.

(56) References Cited

U.S. PATENT DOCUMENTS

| 5,930,366 | A  | 7/1999 | Jamal et al. |
| 7,318,187 | B2 | 1/2008 | Vayanos et al. |

(Continued)

FOREIGN PATENT DOCUMENTS

| CN | 1627677 A | 6/2005 |
| CN | 1638315 A | 7/2005 |

(Continued)

OTHER PUBLICATIONS

ETRI; "P-BCH structure considering soft-combining", 3GPP TSG RAN WG1 Meeting #49bis, Orlando, USA, Jun. 25-29, 2007, pp. 1-7.

(Continued)

*Primary Examiner* — Esther B Henderson
(74) *Attorney, Agent, or Firm* — Ladas & Parry LLP (57) ABSTRACT

A signal transmitting method according to an exemplary embodiment of the present invention includes channel-coding broadcasting channel information by using a first scrambling code in a first frame within a broadcasting channel information updating period including a plurality of frames, and channel-coding the broadcasting channel information by using a second scrambling code in a second frame within the broadcasting channel information updating period. The second scrambling code is different from the first scrambling code.

8 Claims, 9 Drawing Sheets

(51) Int. Cl.
*H04L 1/00* (2006.01)
*H04L 25/03* (2006.01)
*H04L 25/05* (2006.01)
*H04L 1/18* (2006.01)
*H04W 4/18* (2009.01)
*H04W 48/08* (2009.01)

(52) U.S. Cl.
CPC ......... *H04L 25/03866* (2013.01); *H04L 25/05* (2013.01); *H04L 1/0067* (2013.01); *H04L 1/0071* (2013.01); *H04L 1/1845* (2013.01); *H04W 4/18* (2013.01); *H04W 48/08* (2013.01)

(56) References Cited

U.S. PATENT DOCUMENTS

| | | | |
|---|---|---|---|
| 7,715,786 B2 * | 5/2010 | Santoru et al. | 455/12.1 |
| 7,801,088 B2 | 9/2010 | Kim et al. | |
| 2002/0094819 A1 | 7/2002 | Cao et al. | |
| 2003/0099357 A1 | 5/2003 | Ryu et al. | |
| 2004/0085989 A1 | 5/2004 | Boumendil et al. | |
| 2005/0094615 A1 | 5/2005 | Kim et al. | |
| 2005/0123005 A1 | 6/2005 | Park | |
| 2005/0123082 A1 * | 6/2005 | Paul et al. | 375/347 |
| 2005/0226418 A1 * | 10/2005 | Lee et al. | 380/233 |
| 2006/0195762 A1 | 8/2006 | Back | |
| 2007/0074242 A1 * | 3/2007 | Wang et al. | 725/31 |
| 2007/0206638 A1 * | 9/2007 | Santoru et al. | 370/476 |
| 2008/0025338 A1 * | 1/2008 | Gorokhov | 370/441 |
| 2009/0296925 A1 * | 12/2009 | Kishiyama et al. | 380/33 |
| 2010/0128805 A1 | 5/2010 | Tanno et al. | |
| 2010/0177697 A1 | 7/2010 | Tanno et al. | |

FOREIGN PATENT DOCUMENTS

| | | |
|---|---|---|
| CN | 1871804 A | 11/2006 |
| DE | 10328077 B3 | 5/2005 |
| EP | 1 124 345 A2 | 8/2001 |
| EP | 1 517 499 A2 | 3/2005 |
| EP | 1 916 783 A1 | 4/2008 |
| JP | 2006-295726 A | 10/2006 |
| JP | 2007-043330 A | 2/2007 |
| JP | 2009-027677 A | 2/2009 |
| KR | 1020030029330 A | 4/2003 |
| KR | 1020060095225 A | 8/2006 |
| WO | 2005/086446 A1 | 9/2005 |
| WO | 2007/083555 A1 | 7/2007 |

OTHER PUBLICATIONS

International Search Report: PCT/KR2008/001317.

NTT DoCoMo, Fujitsu, Institute for Infocomm Research, Panasonic, Sharp; "BCH Structure for E-UTRA Downlink", 3GPP TSG RAN WG1 Meeting #49bis, Orlando, USA, Jun. 25-29, 2007, R1-072943, pp. 1-8.

Motorola; "Parameters for turbo rate-matching in LTE", 3GPP DRAFT; R1-071795 $3^{rd}$ Generation Partnership Project (3GPP), Mobile Competence Centre, vol. RAN WG!, No. 20070403, Mar. 26-30, 2006, 3 pages.

ETRI; "P-BCH performance improvement using soft-combining", 3GPP DRAFT; R1-071616, $3^{rd}$ Generation Partnership Project (3GPP), Mobile Competence Centre, vol. RAN WG1, No. 20070403, Mar. 26-30, 2007, 4 pages.

Motorola; "E-UTRA P-BCH Performance Re-Evaluation", 3GPP DRAFT; R1-071123, $3^{rd}$ Generation Partnership Project (3GPP), Mobile Competence Centre, vol. RAN WG1, No. 20070218, Feb. 12-16, 2007, 4 pages.

* cited by examiner

Hypothesis 1: (1) → (1)
Hypothesis 2: (1) → (1)

(1): Descrambling by using scrambling code #1
→ : Connecting previous and next data

Hypothesis 1 :  (1) + (2)  (1)
Hypothesis 2 :  (2)  (1) + (2)

(1) : Descrambling by using scrambling code #1
(2) : Descrambling by using scrambling code #2
+ : Soft-combining previous and next data

METHOD AND APPARATUS FOR TRANSMITTING SIGNAL

BACKGROUND (a) Field

The present invention relates to a method and an apparatus for transmitting a signal. More particularly, the present invention relates to a method and an apparatus for transmitting a broadcasting channel signal in a communication system.

(b) Description of the Related Art

A broadcasting channel (BCH) is used for transmitting system information in a communication system such as a cellular system. A terminal detects parameters of a cell by demodulating BCH information when accessing the communication system. Accordingly, a base station should transmit the BCH without any information on the channel information of the terminal, which means that the base station cannot use a link adaptation technique such as a power control or frequency selective scheduling. In addition, since the terminal does not know a bandwidth of a system that the terminal wants to access before demodulating the BCH, the BCH is transmitted through a minimum bandwidth among a plurality of system bandwidths. Accordingly, the terminal occasionally demodulates the BCH under deteriorated conditions.

In spite of the deteriorated demodulation conditions, the BCH should be designed in such a way that is can be demodulated in a low signal-to-interference noise ratio (SINR) because the BCH includes essential information for operation of the terminal. This means that a channel coding rate on the BCH must be very low.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention provides a BCH transmitting method and apparatus for improving demodulation performance of the BCH.

In one exemplary embodiment of the present invention, a method of transmitting a signal in a base station is provided. The method includes updating transmission information every transmission information updating period including a plurality of frames, applying channel-coding to the transmission information by using a scrambling code in each frame within the transmission information updating period, converting channel-coded transmission information to a transmission symbol, and transmitting the transmission symbol. Different scrambling codes are used for different frames within the transmission information updating period.

Applying channel-coding may include applying channel-coding to the same transmission information in each frame within the transmission information updating period.

Alternatively, applying channel-coding may include applying channel-coding to the transmission information by frame.

In addition, the transmission information may include broadcasting channel information, and the broadcasting channel information may include the same system frame number in the plurality of frames within the transmission information updating period.

In another exemplary embodiment of present invention, an apparatus for transmitting a signal in a base station includes means for updating transmission information every transmission information updating period including a plurality of frames, means for applying channel-coding to the transmission information by using a scrambling code in each frame within the transmission information updating period, means for converting the channel-coded transmission information to a transmission symbol, and means for transmitting the transmission symbol. Different scrambling codes are used for different frames within the transmission information updating period.

In yet another exemplary embodiment of the present invention, a method of generating a signal in a base station includes applying channel-coding to transmission information by using a first scrambling code in a first frame within a transmission information updating period including a plurality of frames, and applying channel-coding to the transmission information by using a second scrambling code in a second frame within the transmission information updating period. The second scrambling code is different from the first scrambling code.

The method may further include applying channel-coding to updated transmission information by using the first scrambling code in a third frame within another transmission information updating period subsequent to said transmission information updating period, and applying channel-coding to the updated transmission information by using the second scrambling code in a fourth frame within said another transmission information updating period.

The transmission information may include broadcasting channel information.

In still another exemplary embodiment of the present invention, an apparatus for generating a signal in a base station includes means for applying channel-coding to transmission information by using a first scrambling code in a first frame within a transmission information updating period including a plurality of frames, and means for applying channel-coding to the transmission information by using a second scrambling code in a second frame within the transmission information updating period. The second scrambling code is different from the first scrambling code.

In a further exemplary embodiment of the present invention, a method of receiving a signal in a terminal is provided. The method includes demodulating broadcasting channel information by decoding received frame data with a scrambling code, detecting a system frame number included in the broadcasting channel information, and determining a system frame number of the received frame based on the detected system frame number and the scrambling code.

The broadcasting channel information may be updated every broadcasting channel information updating period including a plurality of frames, and the plurality of frames within the broadcasting channel information updating period may be decoded by using different scrambling codes.

The demodulation of broadcasting channel information may include trying to decode the received frame data by using any one of a plurality of scrambling codes that are respectively allocated to the plurality of frames.

The demodulation of broadcasting channel information may further include decoding by soft-combining data received during at least two received frames when the decoding using the received frame data fails.

In a yet further exemplary embodiment of the present invention, an apparatus for receiving a signal in a terminal includes means for demodulating broadcasting channel information by decoding received frame data with a scrambling code, means for detecting a system frame number included in the broadcasting channel information, and means for determining a system frame number of the received frame based on the detected system frame number and the scrambling code.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this detailed description and the claims which follow, unless explicitly described to the contrary, the word "comprise/include" or variations such as "comprises/includes" or "comprising/including" will be understood to imply the inclusion of stated elements but not the exclusion of any other elements. Each block is a unit for processing at least one function or operation, which can be realized by hardware, software, or a combination of hardware and software.

In addition, a terminal may be referred to as, and include some or all the functionality of, user equipment (UE), a mobile terminal (MT), a subscriber station (SS), a mobile station (MS), a portable subscriber station (PSS), and an access terminal (AT).

Furthermore, a base station (BS) may be referred to as, and include some or all the functionality of, a node-B, an evolved Node-B (eNodeB), an access point (AP), a radio access station (RAS), a base transceiver station (BTS), and a mobile multi-hop relay base station (MMR-BS).

Now, a signal transmitting method and apparatus according to exemplary embodiments of the present invention will be described with reference to the drawings.

Figure 1:
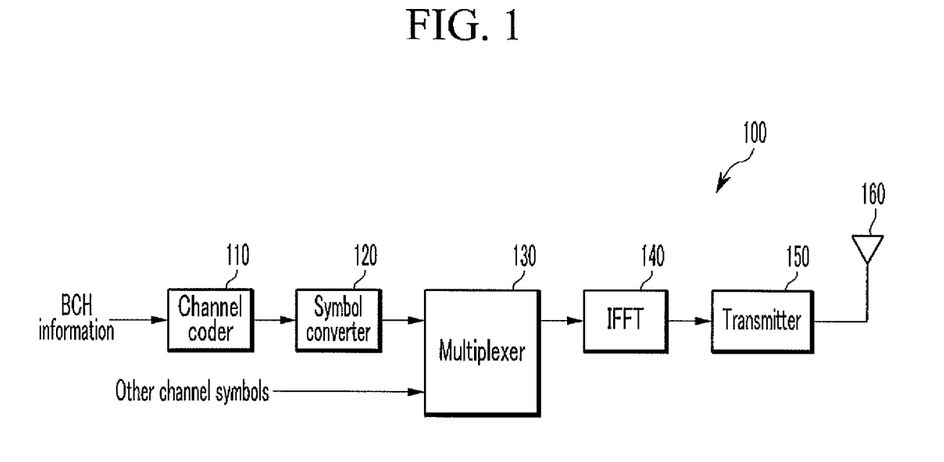
FIG. 1 is a schematic block diagram of a signal transmitting apparatus of a base station according to an exemplary embodiment of the present invention.
Figure 2:
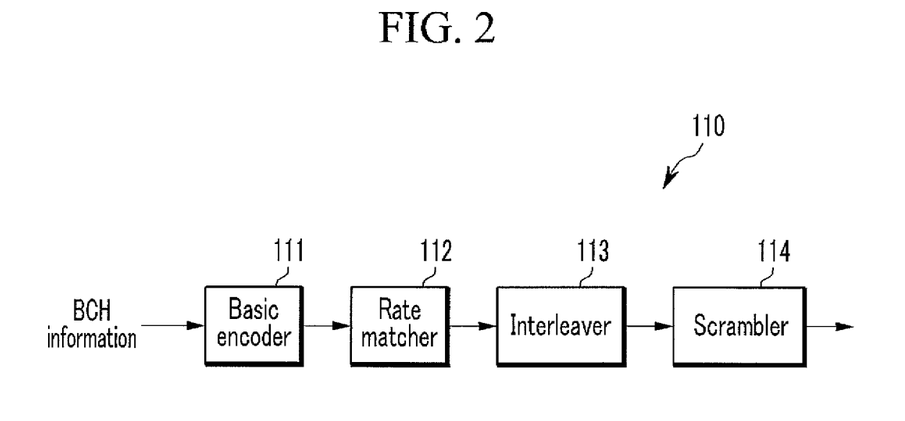
FIG. 2 is a schematic block diagram of a channel coder shown in FIG. 1.

FIG. 1 is a schematic block diagram of a signal transmitting apparatus of a base station according to an exemplary embodiment of the present invention, and FIG. 2 is a schematic block diagram of a channel coder 110 shown in FIG. 1.

Referring to FIG. 1, the signal transmitting apparatus 100 includes the channel coder 110, a symbol converter 120, a multiplexer 130, an inverse fast Fourier transformer (IFFT) 140, and a transmitter 150.

The channel coder 110 performs channel-coding on input BCH bits, i.e., BCH information. The BCH information input to the signal transmitting apparatus 100 includes a system frame number, and is updated once every predetermined number of frames. A period in which the BCH information is updated, i.e., a BCH information updating period, is called a transmission time interval (TTI). It is assumed that the TTI is two frames in the exemplary embodiments of the present invention, but a TTI of over two frames may be used.

The symbol converter 120 converts the channel-coded BCH information to a complex symbol with modulation such as quadrature phase shift keying (QPSK). The multiplexer 130 allocates the BCH symbol and other channel symbols to time and frequency resources in accordance with a predetermined pattern to generate a frequency domain signal. The IFFT 140 transforms the frequency domain signal to a time domain signal by performing the inverse fast Fourier transform. The transmitter 150 transmits the time domain signal through an antenna 160.

Referring to FIG. 2, the channel coder 110 includes a basic encoder 111, a rate matcher 112, an interleaver 113, and a scrambler 114. The basic encoder 111 encodes the BCH bits in accordance with a predetermined coding rate. The rate matcher 112 performs rate-matching process, which punctures or repeats some of output bits of the basic encoder 111 when the number of output bits is not equal to the number of bits that can be transmitted through the time and frequency resources. The interleaver 113 randomly changes an order of the rate-matched bits in order to prevent transmission bits in which error can occur from being localized in a particular interval. The scrambler 114 scrambles output bits of the interleaver 113 with a scrambling code.

Next, a signal transmitting method of a signal transmitting apparatus according to an exemplary embodiment of the present invention will be described with reference to FIG. 3 to FIG. 9.

It is assumed below that the TTI is two frames as described above. Only two TTI, i.e., four frames, are shown in FIG. 3 to FIG. 9 for ease of description. In addition, it is assumed that a system frame number (SFN) included in the BCH information of the first TTI is "K", and that the system frame number included in the BCH information of the second TTI is "K+2". Furthermore, when one frame is divided into a plurality of subframes, it is shown in FIG. 3 to FIG. 9 that the BCH information is allocated to the first subframe among the plurality of subframes, and the other subframes are not shown.

First, conventional BCH transmitting methods will be described with reference to FIG. 3 to FIG. 6.

Figure 3:
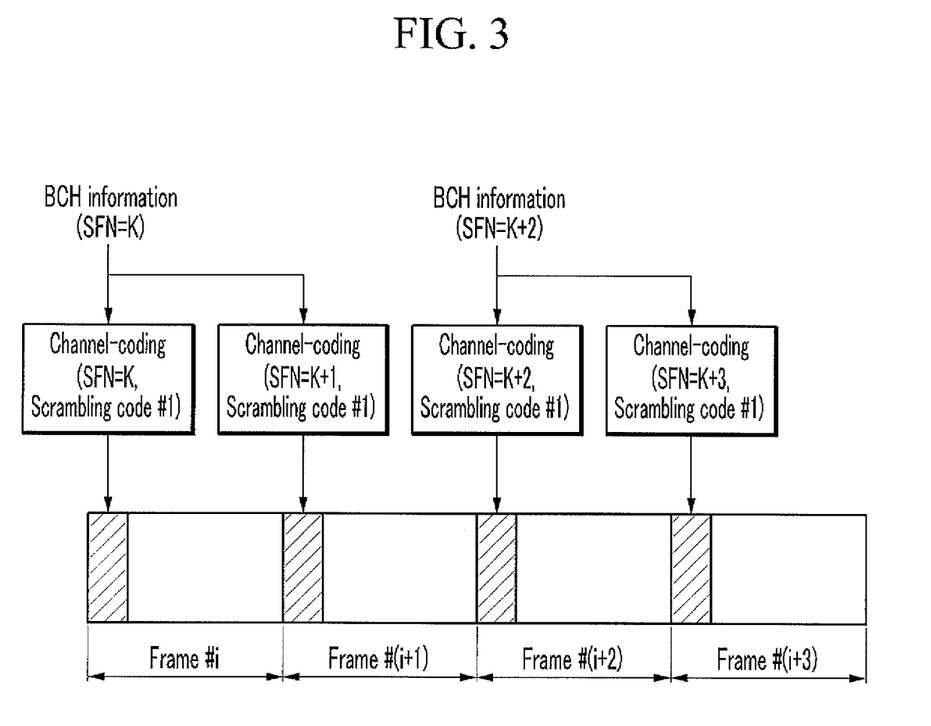
FIG. 3, FIG. 4, and FIG. 6 show conventional BCH transmission structures, respectively.
Figure 4:
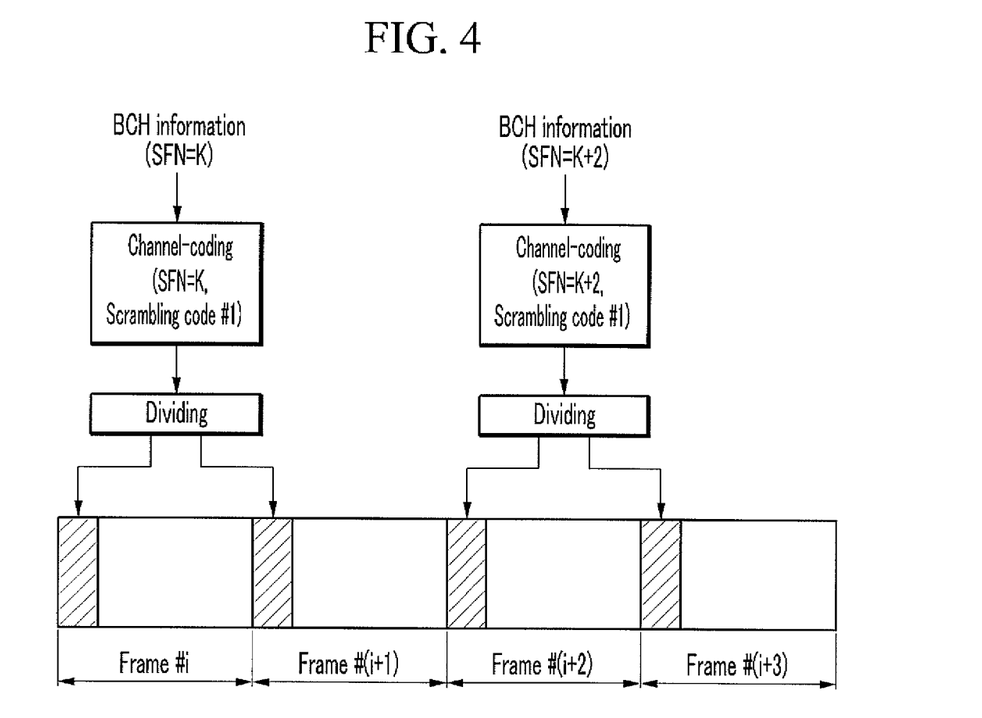
Figure 5:
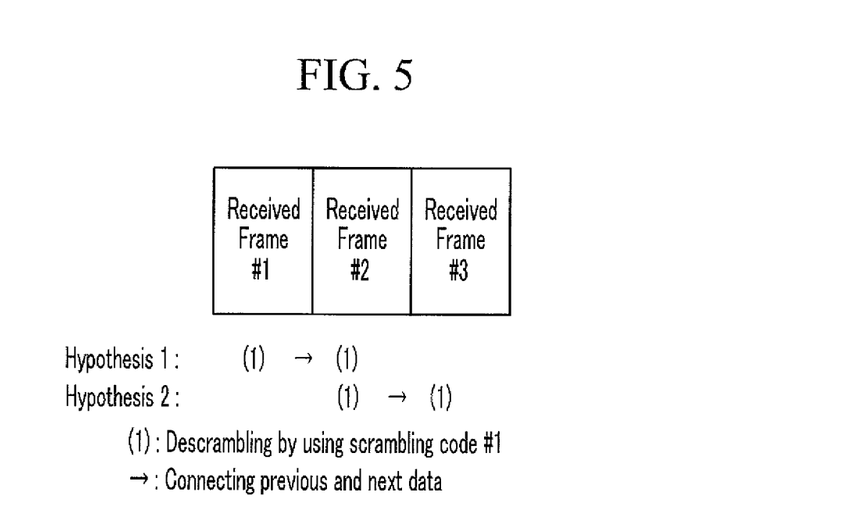
FIG. 5 shows a decoding method of the terminal according to the BCH transmission structure shown in FIG. 4.
Figure 6:
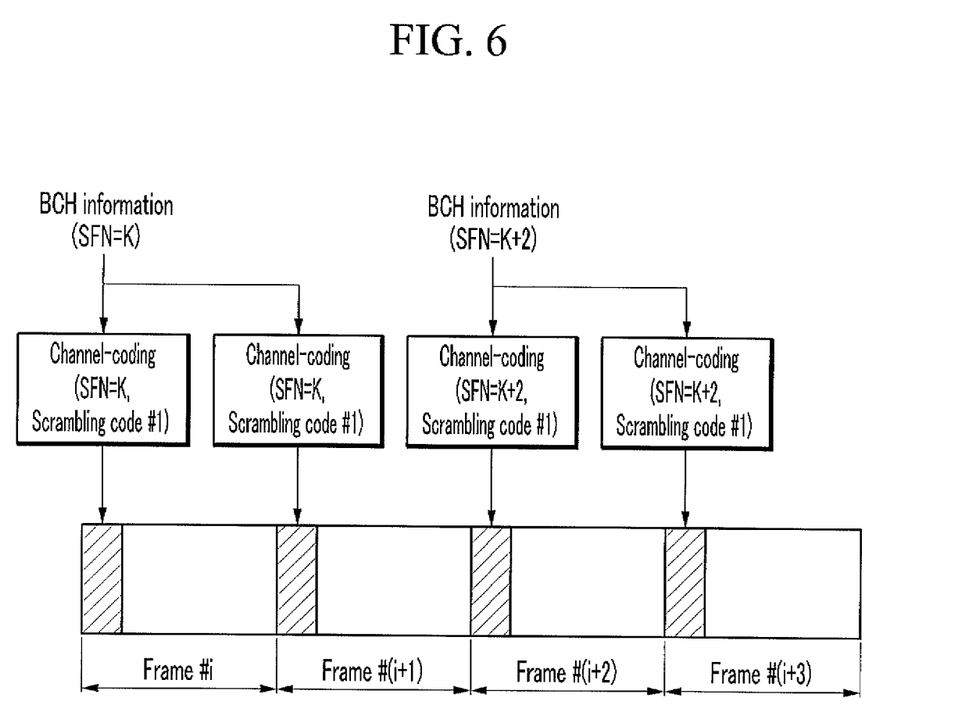

FIG. 3, FIG. 4, and FIG. 6 show conventional BCH transmission structures, respectively, and FIG. 5 shows a decoding method of the terminal according to the BCH transmission structure shown in FIG. 4.

Referring to the BCH transmission structure shown in FIG. 3, since the BCH information is updated every two frames, the system frame number K included in the BCH information is set as the system frame number of the first frame (frame #i) of the TTI, and a value K+1 obtained by adding "1" to the system frame number K included in the BCH information is set as the system frame number of the second frame [frame #(i+1)] of the TTI. The same scrambling code, for example a scrambling code #1, is allocated to the plurality of frames within the TTI. Then, the system frame number is differently set every frame, and the different BCH symbols are transmitted in the different frames. Accordingly, the terminal decodes the BCH symbol by using data received during only one frame, but cannot decode BCH symbols by soft-combining data received during the plurality of frames. However, the base station must use a low coding rate when coding the BCH information to allow the BCH symbol to be demodulated in a low SINR condition. Therefore, the base station cannot efficiently use the time and frequency resources.

Referring to the BCH transmission structure shown in FIG. 4, the channel-coding is performed on the BCH information once every TTI, i.e., two frames, and the same scrambling code (scrambling code #1) is used every TTI. That is, two frame data correspond to one channel coding block. In detail, assuming the number of bits that can be transmitted through one frame is "M", the rate matcher generates 2M bits. The interleaver interleaves 2M bits at once, and the scrambler multiplies the interleaved bits by the scrambling code having a length of 2M. The scrambled output bits having a size of 2M are divided such that M bits are transmitted through the frame #1 and other M bits are transmitted through the frame #(i+1). Therefore, the time and frequency resources used for transmitting the BCH symbols in each frame are half of those according to the BCH transmission structure shown in FIG. 3, such that the base station can efficiently use the resources.

However, since 2M bits are interleaved at once in the BCH transmission structure shown in FIG. 4, the terminal must receive 2M bits during the two frames to demodulate the BCH symbol. Therefore, when the terminal receives the BCH symbol, the terminal does not know which frame within the TTI corresponds to the frame that is received first. Accordingly, the terminal performs blind decoding process under two hypotheses. Referring to FIG. 5, the terminal sets a hypothesis that data received during the first and second frames form the channel coding block (hypothesis 1), and a hypothesis that data received during the second and third frames form the channel coding block (hypothesis 2). If the terminal successfully performs the decoding process at the second received frame in accordance with the hypothesis 1, the terminal determines that the hypothesis 1 is correct, and thus, can demodulate the BCH information. The terminal detects that the system frame number of the first received frame is "K" based on the demodulated BCH information, and determines that the system frame number of the second received frame is "K+1". If the terminal fails in the decoding process in accordance with the hypothesis 1, the terminal performs the decoding process at the third received frame in accordance with the hypothesis 2. As a result, the terminal detects that the system frame number of the second received frame is "K" based on the demodulated BCH information, and determines that the system frame number of the third received frame is "K+1".

As described above, according to the BCH transmission structure shown in FIG. 4, the efficiency of the resource usage can be increased by increasing the length of the coding block. However, the terminal cannot demodulate BCH information without receiving at least two frames even though the terminal is in the high SINR condition, which means that a decoding delay time is increased regardless of the channel condition of the terminal.

Referring to the BCH transmission structure shown in FIG. 6, the channel-coding is performed on the BCH information every frame, and the scrambling code, for example a scrambling code #1, is used every frame. The same system frame number K is transmitted during the frame #i and the frame #(i+1) by the same BCH information. Then, since the terminal can detect the BCH information by receiving data during one frame in the high SINR condition, the decoding delay time can be decreased compared with the BCH transmission structure shown in FIG. 4. In addition, the terminal can perform the decoding process by soft-combining data received during two frames within the TTI in the low SINR condition since the same system frame number is transmitted through the two frames within the TTI. That is, the base station can efficiently use the time and frequency resources because of a soft-combining method. However, the terminal cannot exactly detect the system frame number when receiving one frame data since the same system frame number is transmitted through the two frames within the TTI.

As described above, according to the conventional BCH transmission structures shown in FIG. 3 to FIG. 6, the decoding delay time is increased or the resources cannot be efficiently used. To solve these problems, a BCH transmission structure shown in FIG. 7 is used in an exemplary embodiment of the present invention.

Figure 7:
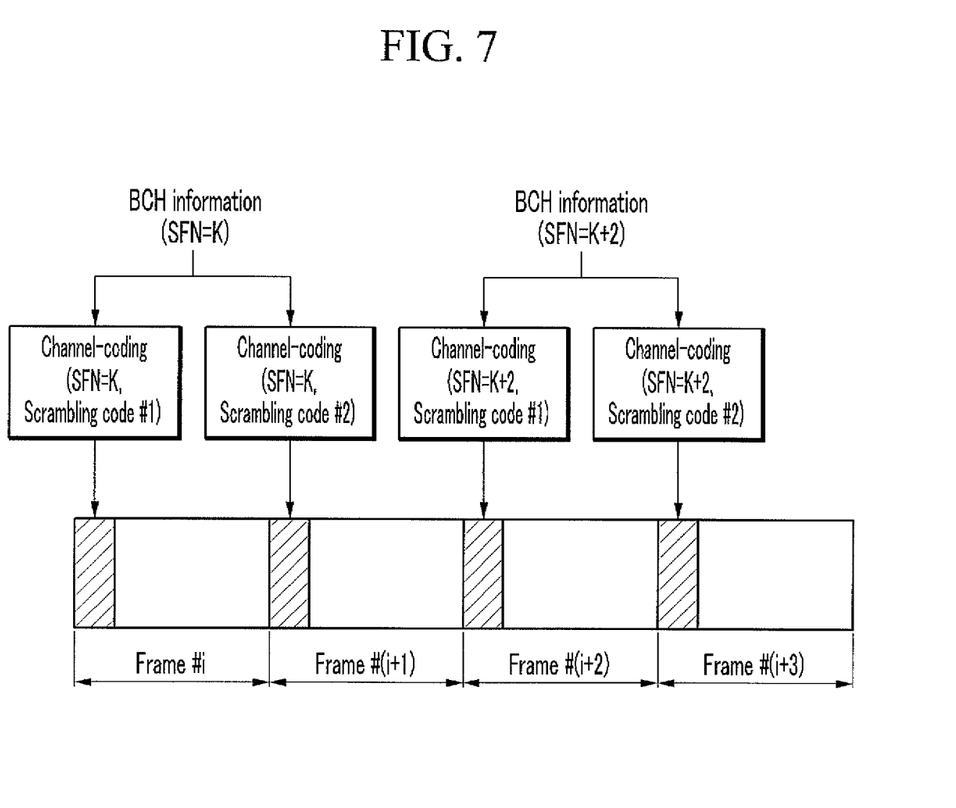
FIG. 7 shows a BCH transmission structure according to an exemplary embodiment of the present invention.
Figure 8:
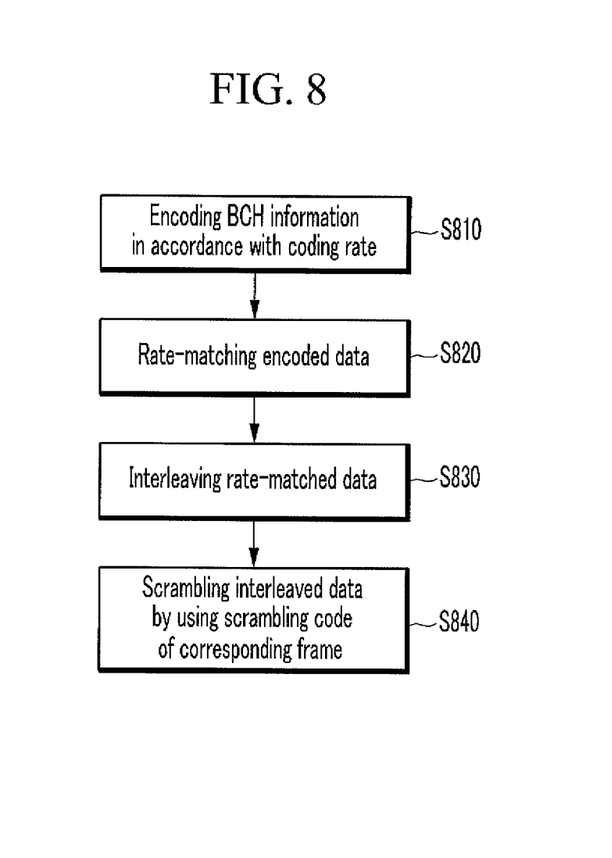
FIG. 8 is a flowchart of a BCH channel-coding method according to an exemplary embodiment of the present invention.
Figure 9:
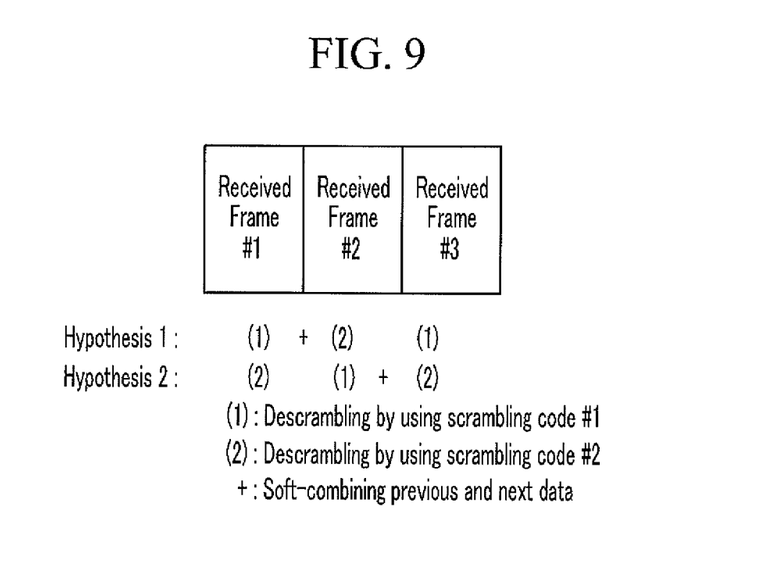
FIG. 9 shows a decoding method of a terminal according to the BCH transmission structure shown in FIG. 7.

FIG. 7 shows a BCH transmission structure according to an exemplary embodiment of the present invention, FIG. 8 is a flowchart of a BCH channel-coding method according to an exemplary embodiment of the present invention, and FIG. 9 shows a decoding method of a terminal according to the BCH transmission structure shown in FIG. 7.

Referring to FIG. 7, in the BCH transmission structure according to the exemplary embodiment of the present invention, the channel coder 110 performs the channel-coding on the same BCH information every frame within the TTI. Then, one channel coding block is transmitted every frame, and channel coding blocks within TTI include the same BCH information. In addition, different scrambling codes are used for the different frames within the TTI. For example, the system frame number K and the scrambling code #1 are used for the frame #i within the TTI, and the system frame number K and the scrambling code #2 are used for the frame #(i+1) within the TTI. As described above, the BCH information used in the channel-coding has the same system frame number regardless of where the frame is located within the TTI. That is, a system frame number obtained by eliminating the lowest 1 bit from a real system frame number may be used in the channel-coding when the TTI includes two frames, and a system frame number obtained by eliminating the lowest 2 bits from the real system frame number may be used in the channel-coding when the TTI includes four frames.

Describing the BCH transmitting method with reference to FIG. 2 and FIG. 8, the basic encoder 111 encodes the BCH information of N bits in accordance with the coding rate at the step S810. Output bits of the basic encoder 111 are 3N bits when the coding rate is ⅓. The rate matcher 112 performs the rate-matching process on the output bits of the basic encoder 111 to output data of M bits at the step S820. The interleaver 113 interleaves the rate-matched data of the M bits at the step S830, and the scrambler 114 scrambles the interleaved data by using the scrambling code allocated to the corresponding frame at the step S840.

In such BCH transmission structure, the terminal performs the blind decoding process under two hypotheses since the terminal does not know exact TTI timing. In detail, referring to FIG. 9, the terminal sets a hypothesis that data received during the first and second frames include the same BCH information, (hypothesis 1) and a hypothesis that data received during the second and third frames include the same BCH information (hypothesis 2). The terminal tests the hypotheses while increasing an index of the received frame. First, the terminal tests the two hypotheses after receiving one frame data. The terminal tries to perform the decoding process by applying the scrambling code #1 to the received frame data in accordance with the hypothesis 1, and tries to perform the decoding process by applying the scrambling code #2 to the received frame data in accordance with the hypothesis 2. If a decoding error does not occur on either of the two hypotheses, the terminal can successfully demodulate the BCH information. In addition, the terminal can detect the real system frame number of the received frame based on the combination of the system frame number K included in the BCH information and a scrambling code number (or a hypothesis number).

On the other hand, if the decoding errors occur on both the hypotheses, the terminal tests the two hypotheses after further receiving the second frame data. The terminal tries to perform the decoding process by soft-combining the data received during the first and second frames when testing the hypothesis 1. However, since the first received frame data and the second received frame data are included in the different TTIs in the case of the hypothesis 2, the data of the first and second received frames cannot be soft-combined. Accordingly, the terminal tries to perform the decoding process by applying the scrambling code #1 to the second received frame data. If the decoding error does not occur on either of the two hypotheses, the terminal can successfully demodulate the BCH information and detect the real system frame number.

On the other hand, if the decoding errors occur on both the hypotheses, the terminal further receives the third frame data, and then tries to perform the decoding process by applying the scrambling code #1 to the third received frame data in accordance with the hypothesis 1 and to perform the decoding process by soft-combining the data received during the second and third received frames in accordance with the hypothesis 2.

As described above, according to the exemplary embodiment of the present invention, the decoding delay time can be decreased since the terminal can demodulate the BCH information by receiving only one frame data if the terminal is in the high SINR condition. In addition, the base station can efficiently use the time and frequency resources while achieving good BCH decoding performance in a very low SINR condition through soft-combining. Furthermore, the terminal can identify the real system frame number of the received frame by using the combination of the system frame number included in the BCH information and the scrambling code number used for the decoding process.

According to the exemplary embodiment of the present invention, the channel coder 110 performs the channel-coding on the same BCH information every frame within the TTI. Accordingly, an output of the basic encoder 111 is the same regardless of where the frame is located within the TTI, but an output of the rate matcher 112 may be the same or not in the plurality of frames within the TTI.

The rate matcher according to exemplary embodiments of the present invention will now be described with reference to FIG. 2, FIG. 10, and FIG. 11 below.

Figure 10:
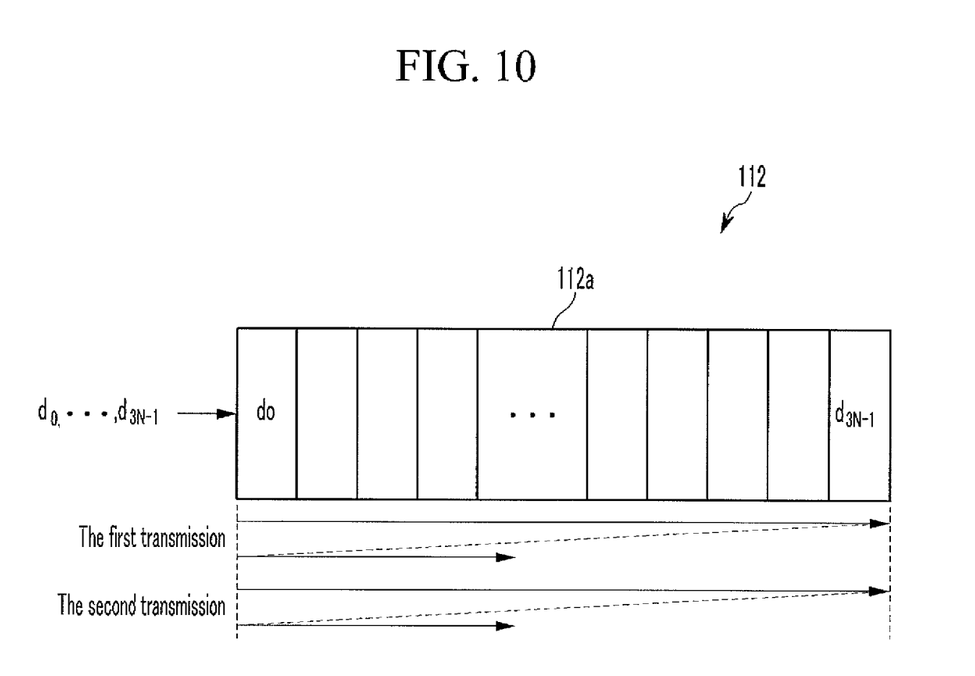
FIG. 10 and FIG. 11 show rate-matching process in a rate matcher according to exemplary embodiments of the present invention.
Figure 11:
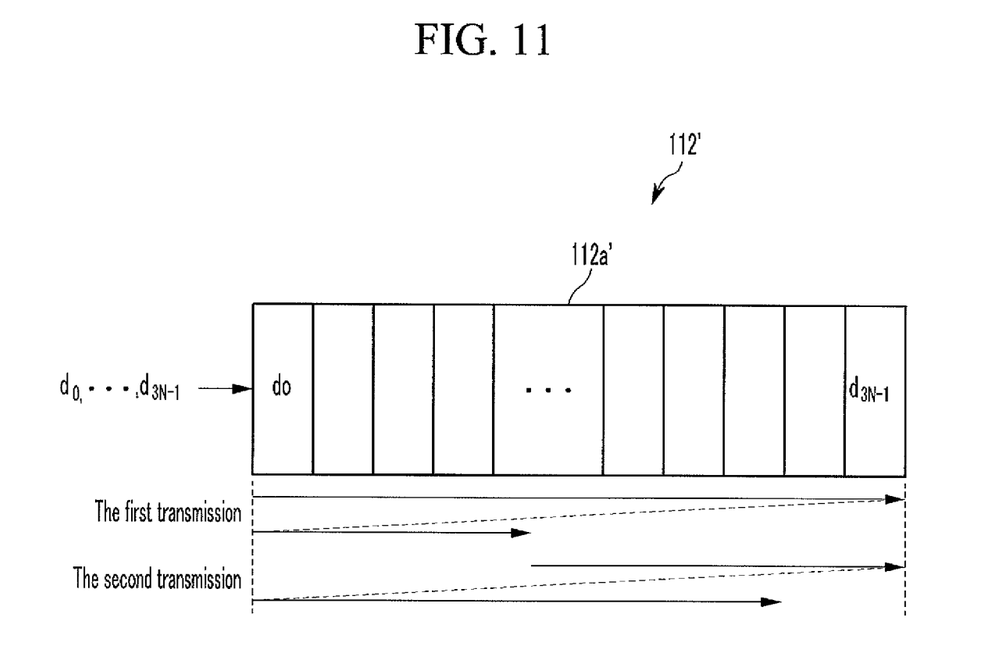

FIG. 10 and FIG. 11 show the rate-matching process in the rate matcher according to exemplary embodiments of the present invention.

When the channel coder 110 shown in FIG. 2 uses the coding rate of ⅓, the basic encoder 111 encodes the BCH information of N bits to output 3N bits $d_0, d_1, \ldots, d_{3N-1}$. Here, $d_k$ (k=0, 1, ..., 3N−1) is an output bit of the basic encoder 111. Assuming the number of bits that can be transmitted in each frame is "M", the rate matcher 112 extracts M bits from data stored in a rate matching buffer.

Referring to FIG. 10, at a time of the first transmission, the rate matcher 112 sequentially extracts data from the first address of the rate matching buffer 112a, and then sequentially extracts data from the first address of the rate matching buffer 112a again when M is greater than 3N. If M is (3N+i), the data extracted from the rate matcher 112 are $d_0, \ldots, d_{3N-1}, d_0, \ldots, d_{i-1}$ as shown in Table 1. In addition, the rate matcher 112 sequentially extracts data $(d_0, d_{3N-1}, d_0, \ldots, d_{i-1})$ of M bits from the first address at a time of the second transmission. This rate matching buffer 112a is called a circular buffer.

TABLE 1

| Transmission number | Output bits of rate matcher |
|---|---|
| 1 | $d_0, \ldots, d_{3N-1}, d_0, \ldots, d_{i-1}$ |
| 2 | $d_0, \ldots, d_{3N-1}, d_0, \ldots, d_{i-1}$ |

Referring to FIG. 11, at the time of the first transmission, the rate matcher 112' extracts data $(d_0, \ldots, d_{3N-1}, d_0, \ldots, d_{i-1})$ of M bits from the rate matching buffer 112a' in the same manner as the rate matcher 112 shown in FIG. 10. However, as shown in Table 2, at the time of the second transmission, the rate matcher 112' extracts data $(d_i, \ldots, d_{3N-1}, d_0, \ldots, d_{2i-1})$ of M bits starting from next bit that is last extracted at the time of the first transmission.

TABLE 2

| Transmission number | Output bits of rate matcher |
|---|---|
| 1 | $d_0, \ldots, d_{3N-1}, d_0, \ldots, d_{i-1}$ |
| 2 | $d_i, \ldots, d_{3N-1}, d_0, \ldots, d_{2i-1}$ |

Then, the output of the rate matcher 112 shown in FIG. 10 is the same in the plurality of frames within the TTI, but the output of the rate matcher 112' shown in FIG. 11 is different in the plurality of frames within the TTI. However, the output bits of the rate matchers 112 and 112' shown in FIG. 10 and FIG. 11 can include all the coded BCH information when M is greater than 3N, which means that the terminal can decode BCH information by observing only one frame data in the high SINR condition.

Next, a signal receiving apparatus of the terminal according to an exemplary embodiment of the present invention will be described with reference to FIG. 12 and FIG. 13 below.

Figure 12:
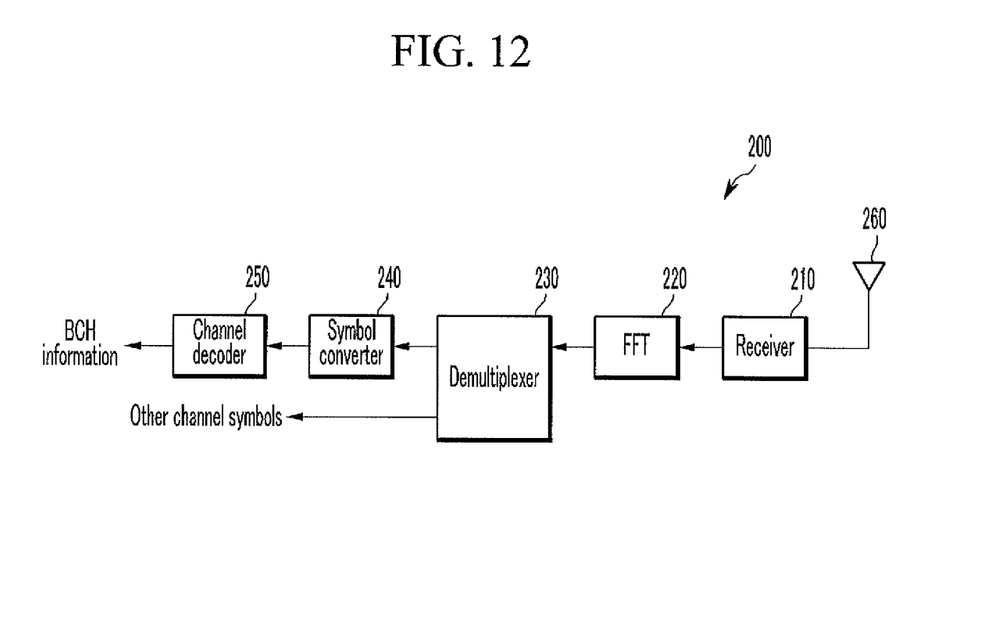
FIG. 12 is a schematic block diagram of a signal receiving apparatus of a terminal according to an exemplary embodiment of the present invention.
Figure 13:
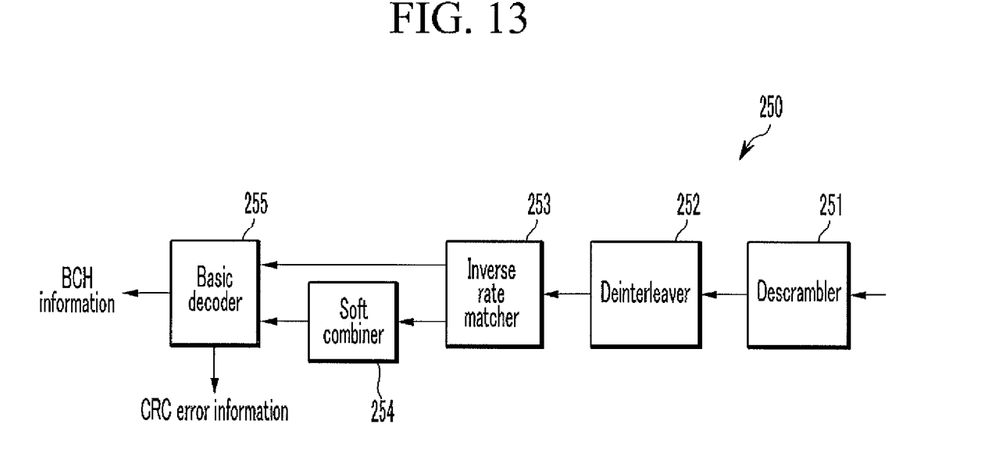
FIG. 13 is a schematic block diagram of a channel decoder shown in FIG. 12.

FIG. 12 is a schematic block diagram of the signal receiving apparatus of the terminal according to an exemplary embodiment of the present invention, and FIG. 13 is a schematic block diagram of a channel decoder shown in FIG. 12.

Referring to FIG. 12, the signal receiving apparatus 200 includes a receiver 210, a fast Fourier transformer (FFT) 220, a demultiplexer 230, a symbol converter 240, and a channel decoder 250.

The receiver 210 converts a time domain signal received through an antenna 260 to a baseband digital signal, and the FFT 220 transforms the baseband digital signal to a frequency domain signal. The demultiplexer 230 extracts the BCH symbol from the frequency domain signal. The symbol converter 240 converts the extracted BCH symbol to bits, and outputs the bits. The channel decoder 250 decodes the output bits of the symbol converter 240 to demodulate the BCH information.

Referring to FIG. 13, the channel decoder 250 includes a descrambler 251, a deinterleaver 252, an inverse rate matcher 253, a soft combiner 254, and a basic decoder 255. The descrambler 251 descrambles the output bits of the symbol converter 240. In detail, as described with reference to FIG. 9, the descrambler 251 descrambles the output bits by using the scrambling code #1 or #2 in accordance with the hypothesis 1 or 2. The deinterleaver 252 deinterleaves the descrambled bits, and the inverse rate matcher 253 adjusts the number of the deinterleaved bits or an order of the deinterleaved bits to allow the deinterleaved bits to be decoded by the basic decoder 255. The soft-combiner 254 soft-combines the inverse rate-matched bits and bits of a previous received frame in accordance with the hypothesis 1 or 2 shown in FIG. 9. The basic decoder 255 decodes the bits that are soft-combined by the soft-combiner 254 or the inverse rate-matched bits of the inverse rate matcher 253 (in the case where the bits have not been soft-combined) in accordance with the predetermined coding rate to demodulate the BCH information. In addition, the basic decoder 255 informs whether the decoding is successful or not. For example, the basic decoder 255 may inform whether the decoding is successful or not through cyclic redundancy check (CRC) error information.

According to an exemplary embodiment of the present invention, a terminal can demodulate BCH information with one frame data in the high SINR condition such that a decoding delay time can be decreased. In addition, the terminal can perform decoding process by soft-combining in the low SINR condition such that a base station can efficiently use resources. Furthermore, a terminal can exactly detect a system frame number even when only one frame data is received.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiments of the present invention, but, on the contrary, are intended to be realized by a program for realizing functions corresponding to the configurations of the exemplary embodiments of the present invention or a recording medium for recording the program.

What is claimed is:

1. A method of transmitting broadcast channel information in a base station, the method comprising:
   generating broadcast channel information every transmission time interval including a plurality of consecutive frames;
   scrambling the broadcast channel information with a scrambling code in the transmission time interval;
   modulating the scrambled broadcast channel information to generate transmission symbols; and
   transmitting the transmission symbols,
   wherein the scrambling code has different codes in different consecutive frames within the transmission time interval.

2. The method of claim 1, further comprising:
   encoding the broadcast channel information; and
   rate matching the encoded broadcast channel information.

3. The method of claim 2, wherein rate matching the encoded broadcast channel information comprises:
   storing bits of the encoded broadcast channel information to a circular buffer; and
   extracting bits in a circle from the circular buffer.

4. A method of transmitting broadcast channel information in a base station, the method comprising:
   generating broadcast channel information every transmission time interval including a plurality of consecutive frames;
   scrambling the broadcast channel information with a scrambling code in the transmission time interval;
   wherein the scrambling code has different codes in different consecutive frames within the transmission time interval;
   modulating the scrambled broadcast channel information to generate transmission symbols;
   transmitting the transmission symbols; and
   initializing the scrambling code every transmission time interval.

5. A method of receiving broadcast channel information in a terminal, the method comprising:
   receiving transmission symbols;
   blindly acquiring a timing of a transmission time interval including a plurality of consecutive frames; and
   extracting broadcast channel information from the transmission symbols,
   wherein the broadcast channel information included in the transmission symbols is scrambled with a scrambling code in the transmission time interval,
   wherein the scrambling code has different codes in different consecutive frames within the transmission time interval; and
   wherein the scrambling code is initialized every transmission time interval.

6. A non-transitory computer-readable medium having a program stored thereon for executing a method of transmitting broadcast channel information in a base station, the method comprising:
   generating broadcast channel information every transmission time interval including a plurality of consecutive frames;
   scrambling the broadcast channel information with a scrambling code in the transmission time interval;
   modulating the scrambled broadcast channel information to generate transmission symbols; and
   transmitting the transmission symbols,
   wherein the scrambling code has different codes in different consecutive frames within the transmission time interval.

7. A non-transitory computer-readable medium having a program stored thereon for executing a method of transmitting broadcast channel information in a base station, the method comprising:
   generating broadcast channel information every transmission time interval including a plurality of consecutive frames;
   scrambling the broadcast channel information with a scrambling code in the transmission time interval;
   wherein the scrambling code has different codes in different consecutive frames within the transmission time interval;
   modulating the scrambled broadcast channel information to generate transmission symbols;
   transmitting the transmission symbols; and
   initializing the scrambling code every transmission time interval.

8. A non-transitory computer-readable medium having a program stored thereon for executing a method of receiving broadcast channel information in a terminal, the method comprising:
   receiving transmission symbols;
   blindly acquiring a timing of a transmission time interval including a plurality of consecutive frames; and
   extracting broadcast channel information from the transmission symbols,
   wherein the broadcast channel information included in the transmission symbols is scrambled with a scrambling code in the transmission time interval,
   wherein the scrambling code has different codes in different consecutive frames within the transmission time interval; and
   wherein the scrambling code is initialized every transmission time interval.

* * * * *